United States Patent
Thorson

(10) Patent No.: US 9,674,064 B1
(45) Date of Patent: Jun. 6, 2017

(54) TECHNIQUES FOR SERVER TRANSACTION PROCESSING

(71) Applicant: Republic Wireless, Inc., Raleigh, NC (US)

(72) Inventor: Dean Thorson, Grayslake, IL (US)

(73) Assignee: REPUBLIC WIRELESS, INC., Raleigh, NC (US)

( * ) Notice: Subject to any disclaimer, the term of this patent is extended or adjusted under 35 U.S.C. 154(b) by 0 days.

(21) Appl. No.: 15/390,576

(22) Filed: Dec. 26, 2016

(51) Int. Cl.
*G06F 15/173* (2006.01)
*H04L 12/26* (2006.01)
*H04L 29/08* (2006.01)
*H04L 29/06* (2006.01)

(52) U.S. Cl.
CPC .......... *H04L 43/0876* (2013.01); *H04L 43/04* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,418,544 B1* | 7/2002 | Nesbitt | H04L 67/2852 709/224 |
| 2006/0010353 A1* | 1/2006 | Haugh | G06F 1/206 714/47.2 |
| 2012/0260305 A1* | 10/2012 | Gerlach | H04L 12/40006 726/1 |
| 2013/0322414 A1* | 12/2013 | Chowdhary | H04W 4/08 370/337 |

* cited by examiner

*Primary Examiner* — Brian Whipple
(74) *Attorney, Agent, or Firm* — Gregory Stephens

(57) ABSTRACT

Various embodiments are generally directed to techniques for transaction processing in servers. Some embodiments are particularly directed to a transaction processing system that is able to induce random bounded delay in processing transactions at a server. In some embodiments, the transaction processing system may monitor a rate of transaction requests received at a server and determine whether to delay servicing at least one requested transaction based on comparing the rate of transaction requests received, or a value at least partially based thereon, to one or more thresholds.

20 Claims, 11 Drawing Sheets

TECHNIQUES FOR SERVER TRANSACTION PROCESSING

BACKGROUND

In computing, a server may refer to a computer program or a device that provides functionality for other programs or devices, called clients. Servers usually provide various functionalities, often called services, such as sharing data or resources among multiple clients or performing computation for a client. For instance, a server may collect, store, modify, and/or retrieve data transactions of an enterprise. Typically, a server operates under a request-response model. Under the request-response model, a client requests a server process or services a transaction by sending a transaction request to the server. The server may process or service the requested transaction by performing some action, such as a calculation. A transaction response may then be sent back to the client that includes a result or acknowledgement that the requested transaction was processed or serviced.

DETAILED DESCRIPTION

Figure 1:
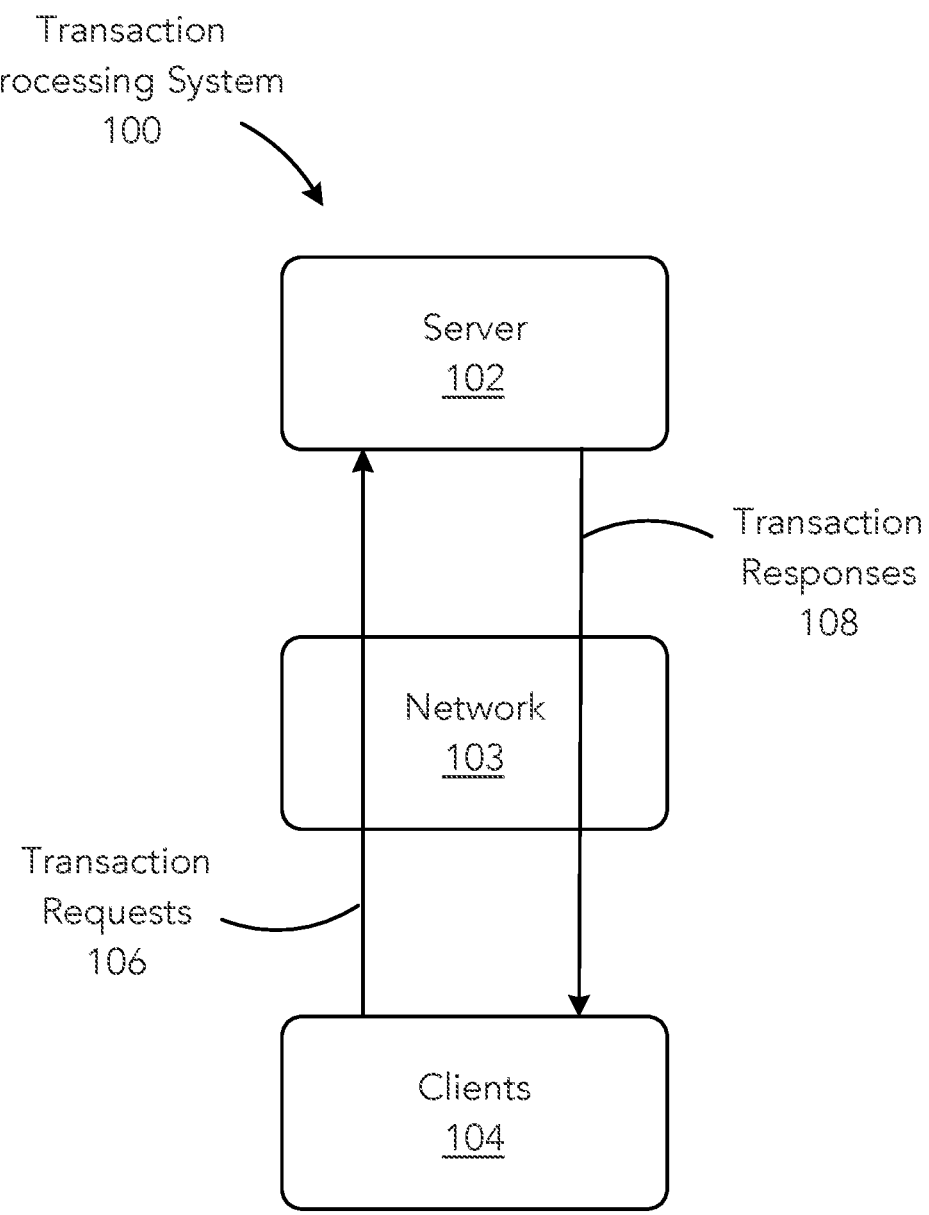
FIG. 1 illustrates an embodiment of a transaction processing system.

Various embodiments are directed to techniques for transaction processing in servers. Some embodiments are particularly directed to a transaction processing system that can induce a random bounded delay in processing transactions at a server. In some embodiments, the transaction processing system may monitor a rate of transaction requests received at a server and determine whether to delay servicing at least one requested transaction based on comparing the rate of transaction requests received, or a value at least partially based thereon, to one or more thresholds. Various embodiments described herein may include a transaction manager to distribute servicing requested transactions over time when the rate of transaction requests received exceeds one or more thresholds by delaying delivery of at least one requested transaction to a processor element for service. For example, the transaction manager may delay delivery of one or more requested transactions to one or more processor elements in a server to move thermal loading on the server from a peak to a short-term average condition, thereby reducing the rate of heat generation in the server and preventing a reduction in clock speed of one or more processors.

Some challenges facing transaction processing systems include impractical, inflexible, and inefficient techniques for preventing or mitigating thermal effects in a server. In various embodiments, a transaction processing system may operate on a stimulus/response basis, where a transaction request is processed with as little delay as possible. However, this asynchronous operation can yield hardware inefficiencies, where high traffic volume consumes a great amount of peak power when a large number of transaction requests align. For example, performing transactions with as little delay as possible at times of peak demand can create a thermal issue (e.g., the server overheats), and the thermal issue may be dealt with by lowering the clock speed of one or more processors in the server. However, lowering the clock speed makes transaction processing slow and inefficient. These and other factors may result in a transaction processing system with poor performance and limited adaptability. Such limitations can drastically reduce the performance and usability of the transaction processing system.

Various embodiments described herein include a transaction processing system with a transaction manager to efficiently handle periods of peak load conditions. The transaction manager may enable a transaction processing system to more efficiently handle a period of peak demand by introducing random bounded delays in the servicing of requested transactions based on a rate of transaction requests received at a server, or a value based at least partially thereon, such as a thermal load. For example, the transaction manager may determine a thermal load based on an incoming rate of requested transactions and determine whether to delay delivery of one or more requested transactions to a processor element for service in order to prevent a thermal manager from reducing the clock speed of processors in response to detecting an excessive buildup of heat in the server. In various embodiments, the amount of service delay may dynamically vary based on comparison of the rate of requested transactions to a plurality of thresholds to maximize transaction processing speed. In some embodiments, requested transactions may be classified to improve accuracy in determining one or more of the thermal load and the optimal amount of service delay. In these and other ways the transaction processing system may enable quick and efficient transaction processing to achieve better performing and more dynamic transaction processing systems, resulting in several technical effects and advantages.

In some embodiments, a rate of transaction requests received at a server may be monitored and the rate of transaction requests received may be compared to a first threshold. In some such embodiments, a determination of whether to delay servicing at least one requested transaction may be made based on the comparison of the rate of transaction requests received and the first threshold. For instance, service of at least one requested transaction may be delayed when the rate of transaction requests received is above the first threshold. In another instance, service of each transaction request received may proceed without delay when the rate of transaction requests received is below the first threshold.

In various embodiments, a transaction manager of a transaction processing system may include a memory and logic, at least a portion of which is implemented in circuitry coupled to the memory. The logic of the transaction manager may monitor a rate of transaction requests received at a server. In various embodiments, the server may include a plurality of processor elements to service requested transactions. The logic of the transaction manager may determine a thermal load on the server. In various embodiments, determination of the thermal load may be based on one or more of the rate of transaction requests received at the server and classification of the requested transactions, such as by resource utilization to service requested transactions. In various embodiments, the thermal load may be the rate of transaction requests received at the server. In some embodiments, the resource utilization to service requested transactions may be referred to as the transaction load or required resources. In some such embodiments, the thermal load may be the transaction load. The logic of the transaction manager may compare the thermal load to a thermal threshold and determine whether to delay delivery of at least one requested transaction to a processor element of the plurality of processor elements to reduce an actual rate of transaction service in the server. In some embodiments, the thermal threshold may be at or below a rate of transaction service in the server that may cause the server to generate heat at an unmaintainable rate. In some such embodiments, the unmaintainable rate may result in a reduction of clock speed in the plurality of processor elements absent delay of delivery of at least one requested transaction to a processor element of the plurality of processor elements for service.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of a transaction processing system 100. The transaction processing system 100 may include a server 102, a network 103, and clients 104. In various embodiments, clients 104 may send transaction requests 106 to server 102 via the network 103 and each transaction request may identify a transaction that the sending client would like performed (e.g., serviced or processed). Note that the transaction request may also be delivered to server 102 through a localized communication means, as an alternate embodiment. As the server 102 receives transaction requests 106, typically it performs each requested transaction and responds to each requested transaction by sending a transaction response to each of the clients 104 that the server 102 received a transaction request from. Generally, the server 102 may operate under two load conditions relating to the rate at which transactions requests are received and processed. One may be referred to as non-peak load conditions and the other may be referred to as peak load conditions. Under non-peak load conditions, the server 102 may be able to perform each requested transaction as quickly as possible without generating heat in the server 102 at an unmaintainable rate. Under peak load conditions the server 102 may not be able to service each requested transaction as quickly as possible without generating heat in the server 102 at an unmaintainable rate. Embodiments are not limited in this context.

As used herein, an unmaintainable rate of heat generation may refer to a level of activity (e.g., rate of transaction service) in the server 102 that leads to heat accumulating within the server 102 at a rate that may not be adequately dissipated without reducing the performance of one or more hardware components of the server 102. In various embodiments, reducing the performance of one or more hardware components of the server 102 may be the result of protective features of the server 102 or overheating of the server 102. For example, an unmaintainable rate of heat generation may lead to protective features of the server 102, such as reducing the clock speed of one or more processing elements within the server. In another example, an unmaintainable rate of heat generation may lead to the failure of one or more hardware components of the server 102.

In various embodiments, the server 102 may include one or more features or components that enable some unmaintainable rates of heat generation within the server 102 to be mitigated without reducing the performance of hardware components of the server 102. In such embodiments, a short-term peak load condition may be moved to an average level by distributing the performance of transactions over a short window of time. For example, transactions may be distributed in time by introducing a random bounded delay for a transaction request to processor elements. In some embodiments, moving a short-term peak load condition to an average level may prevent protective features of the server 102 from reducing the clock speed of one or more processing elements within the server, thereby improving performance and efficiency of the server 102.

In various embodiments, the random bounded delay may delay a transaction by a random amount, the amount may be random so that short-term peak load conditions are moved to an average level over a short window of time. In various such embodiments a random number generator may be utilized in determining the random amount of the delay. In some embodiments, the random bounded delay may be bounded to prevent the performance of the transaction processing system 100 from being significantly affected by inducing the delay. In other words, the randomly chosen amount a transaction is delayed may be bounded or within a defined range of amounts. In some embodiments, a plurality of different bounds or ranges may be used. For example, a small random bounded delay for a transaction may be 1-5 nanoseconds, a medium random bounded delay may be 6-10 nanoseconds, and a large random bounded delay may be 11-15 nanoseconds. In various embodiments, a plurality of different bounds for delays may enable better control over the processing of transactions. For instance, a short-term peak load may be moved to different average levels based on various performance considerations of transaction processing system 100.

It will be appreciated that while components of the transaction processing system 100 can include the various arrangements and embodiments described herein, other arrangements and embodiments can additionally or alternatively be implemented to delay server transactions to mitigate periods of peak load conditions without departing from the present disclosure.

Figure 2:
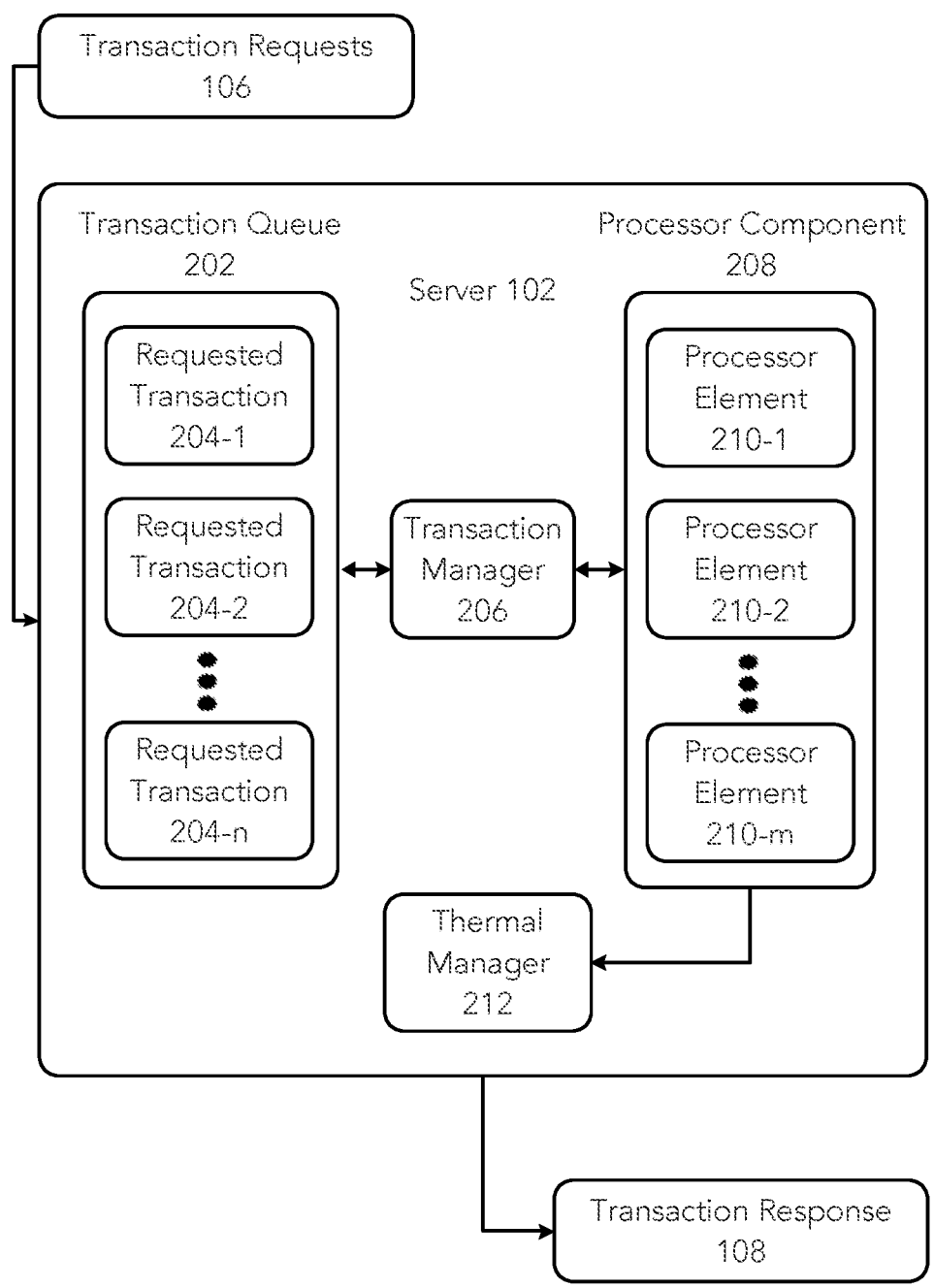
FIG. 2 illustrates an embodiment of a server.

FIG. 2 illustrates an embodiment of server 102. Server 102 may include a transaction queue 202, a transaction manager 206, processor component 208, and thermal manager 212. Each time the server 102 receives a transaction request, the transaction request may be added to the transaction queue 202 as a requested transaction 204-1, 204-2, 204-n. The transaction manager 206 may monitor the rate that transaction requests 106 are received and assign each requested transaction 204-1, 204-2, 204-n to one or more processor elements 210-1, 210-2, 210-m of the processor component 208 for service. In various embodiments the transaction manager 206 may assign and/or deliver each requested transaction 204-1, 204-2, 204-n to one or more processor elements 210-1, 210-2, 210-m based on properties of the requested transaction 204-1, 204-2, 204-n, such as time of entry, priority, required resources, thermal load, and the like. In various such embodiments, the transaction manager 206 may determine or project one or more of the properties of the requested transaction 204-1, 204-2, 204-3. For example, the transaction manager 206 may determine a projected thermal load of one or more of the requested transactions 204-1, 204-2, 204-n. In various embodiments, a projected value may refer to an effect a value is estimated or predicted to have on one or more aspects of transaction processing system 100, such as thermal loading. In various such embodiments, projected values may be used to forecast the effects on one or more components of transaction processing system 100, such as one or more effects of servicing a requested transaction. In some embodiments, the transaction manager 206 may determine whether to delay delivery of one or more of the requested transactions 204-1, 204-2, 204-n based on one or more of the rate that transaction requests 106 are received by server 102 and one or more properties of the requested transactions 204-1, 204-2, 204-n. This and other features of the transaction manager 206 may result in a more efficient and better performing transaction processing system 100, as will be described in more detail below, such as with respect to FIG. 4. Embodiments are not limited in this context.

In the illustrated embodiment, the transaction queue 202 may include a plurality of requested transactions 204-1, 204-2, 204-n that are waiting to be serviced by processor components 208. As will be appreciated, the number of requested transactions in the transaction queue 202 may vary dynamically between zero and an upper limit. The upper limit may be determined by the amount of memory allocated to the transaction queue 202. When the upper limit is exceeded, overflow may occur and one or more requested transactions may be lost. Under peak-load conditions requested transactions 204-n may be added to the transaction queue 202 at a rate faster than they can be serviced. In some embodiments, when the rate of transaction requests received at the server 102 reaches the maximum allowable rate of transaction service by processor component 208 the transaction manager 206 may begin inducing random bounded delays in server transactions. In some such embodiments, this rate of transaction requests received may define a threshold value.

In the illustrated embodiment, the processor component 208 may include a plurality of processor elements 210-1, 210-2, 210-m that are used to service requested transactions 204-1, 204-2, 204-n. As will be appreciated, the number of processor elements in processor component 208 may vary from system to system or even within a system. For example, the processor component 208 may include one or more virtual processor elements that can be instantiated on demand. In some embodiments, the transaction manager 206 may be able to add additional real or virtual processor elements when the transaction queue 202 is at risk of overflowing. For instance, peak load conditions may persist for a period of time that is too long for inducing random bounded delay in server transactions to handle without causing the transaction queue 202 to overflow.

In embodiments, the server 102 may include a thermal manager 212. The thermal manager 212 may monitor one or more parameters of the processor component 208, such as the temperature and clock speed of each of the processor elements 210-1, 210-2, 210-m. In various embodiments, the thermal manager 212 may provide protective features to the server 102, such as reducing the performance of one or more processor elements 210-1, 210-2, 210-m. For example, the thermal manager 212 may reduce the clock speed of each of the processor elements 210-1, 210-2, 210-m in response to the temperature reaching a threshold. In some embodiments, inducing a random bounded delay in server transactions may move a short-term peak load to an average level, distributing the transactions over and short window of time and thereby preventing the temperature rising to a level that causes the thermal manager 212 to reduce the clock speed of processor elements 210-1, 210-2, 210-m. In some such embodiments, lowering the clock speed would slow transaction processing much more than a random bounded delay.

Figure 3:
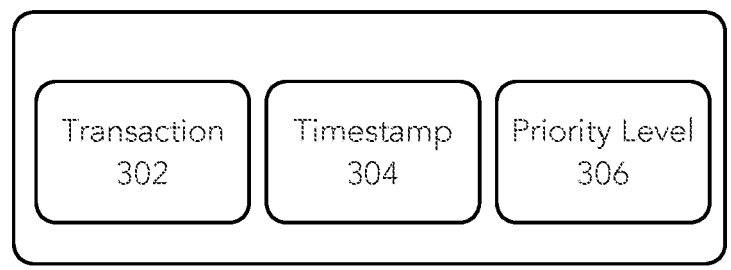
FIG. 3 illustrates an embodiment of a requested transaction.

FIG. 3 illustrates an embodiment of a requested transaction 204. In various embodiments, requested transaction 204 may describe any transaction requests received by and pending service in server 102. The requested transaction 204 may include one or more informational elements that assist the transaction manager 206 in determining how and when to process the requested transaction. In the illustrated embodiment, the requested transaction 204 may include the following informational elements: a transaction 302, a timestamp 304, and a priority level 306. However, in other embodiments, the requested transaction 204 may include more or less informational elements, such as an indication of the client that sent the requested transaction 204. In various embodiments, one or more informational elements of a requested transaction 204 may be retained or discarded by transaction manager 206 and/or processor component 208. In some embodiments, transaction 302 informational element identifies to server 102 the transaction that is requested to be performed. In some such embodiments, the transaction manager 206 may determine the resource utilization of the requested transaction 204 or classify the requested transaction 204 based on the transaction 302 informational element.

In various embodiments, the timestamp 304 informational element may indicate when the transaction request was received by the server 102. For instance, whenever a transaction request is received by the server 102, a timestamp generated and included in the corresponding requested transaction 204 when the corresponding requested transaction 204 is added to the transaction queue 202. In some embodiments the priority level 306 informational element may indicate a processing or service priority to be afforded to the requested transaction 204 by the server 102. For instance, if requested transaction 204-2 has a higher priority level than requested transaction 204-1, then requested transaction 204-2 may be assigned to a processor element before requested transaction 204-1. Embodiments are not limited in this context.

Figure 4:
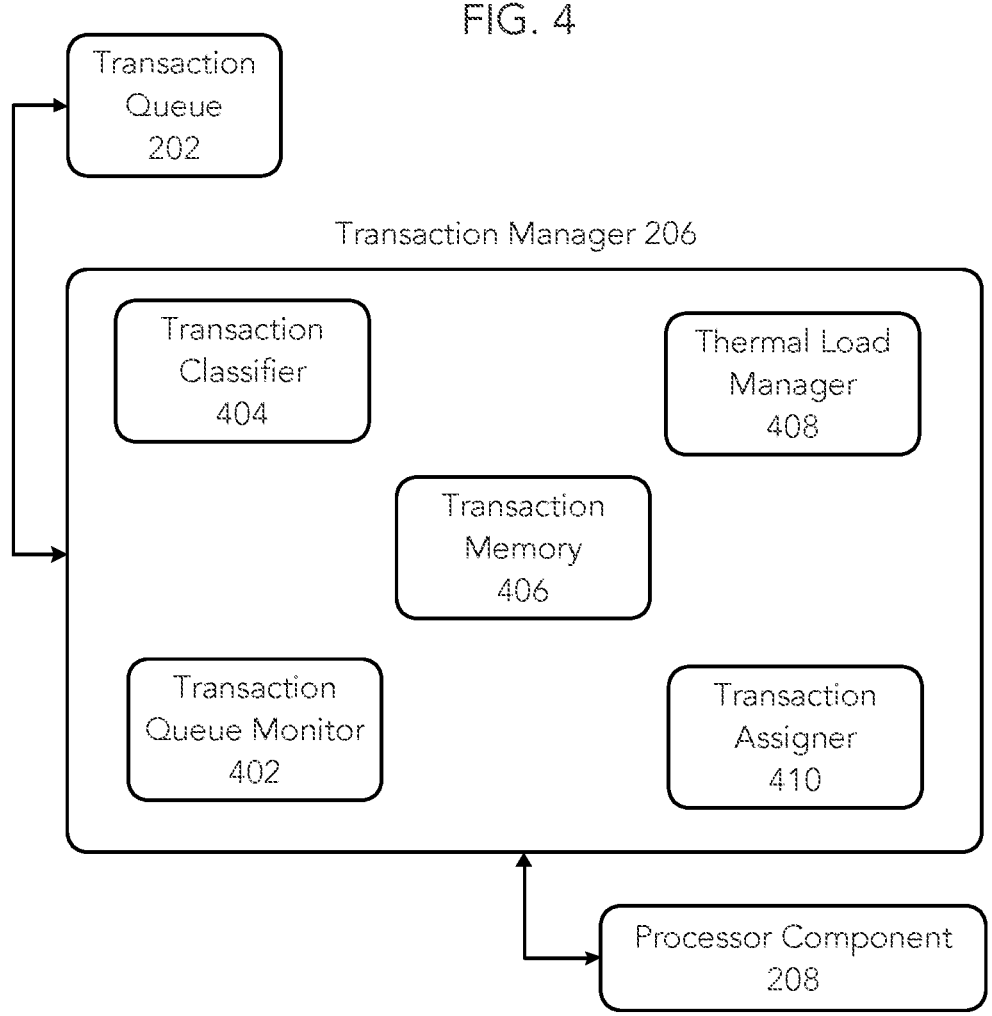
FIG. 4 illustrates an embodiment of a transaction manager.

FIG. 4 illustrates an embodiment of transaction manager 206. Transaction manager may include transaction queue monitor 402, transaction classifier 404, transaction memory 406, thermal load manager 408, and transaction assignor 410. The components of transaction manager 206 may interoperate to initiate a random bounded delay process on delivery of transactions to processor component 208. The randomization may move a short-term peak load to an average level, distributing the transactions over a short window of time. The transaction processing system 100 performance, while delayed, does not trigger a reduction in clock speed of the processor component 208. This may result in a more efficient and better performing system because lowering the clock speed slows transaction processing much more than a random bounded delay would. Embodiments are not limited in this context.

In some embodiments, the transaction queue monitor 402 may monitor the rate at which transaction requests 106 are received by server 102. In some embodiments, the transaction queue monitor 402 may monitor the rate at which transaction requests 106 are received by server 102 by monitoring the rate at which requested transactions are added to the transaction queue 202. In various embodiments, the transaction queue monitor 402 may select requested transactions from the transaction queue for assignment to one or more processor component 208 for processing. In various such embodiments, the transaction queue monitor 402 may determine which requested transaction 204 should be serviced next based on one or more characteristics of each requested transaction, such as the informational elements described above with respect to FIG. 3. For example, the transaction queue monitor 402 may select for assignment based on a combination of the timestamp and priority level associated with the requested transaction. In some embodiments, the transaction queue monitor 402 may cause service of requested transactions to be delayed. In some such embodiments, the transaction queue monitor 402 may cause service of requested transactions to be delayed in response to the rate of transaction requests received at the server 102 exceeding a threshold.

In various embodiments, the transaction classifier 404 may attempt to classify each requested transaction 204 and if the transaction classifier 404 is unable to classify a requested transaction, the requested transaction 204 may be tagged for classification, as will be described in more detail with respect to FIG. 7. In some embodiments, the different classes of requested transactions may be handled in parallel. For example, requested transactions may be classified based on their predicted resource utilization (e.g., short, medium, and long classes). In such examples, the classes may then be handled in parallel such that short transactions are compared to each other, medium transactions are compared to each other, and long transactions are compared to each other.

In some embodiments, the thermal load manager 408 may determine when and/or how to induce random bounded delays in server transactions. In some embodiments, the thermal load manager 408 may determine a thermal load on server 102 based on one or more parameters and use the thermal load to determine when and/or how to induce random bounded delays in server transactions. For example, the thermal load manager 408 may determine the thermal load on the server based on one or more of the rate of transaction requests received at the server 102, the transaction queue 202, a thermal load of requested transactions, transaction load of requested transactions, and the output or contents of one or more components of transaction manager 206, such as the transaction classifier 404, transaction queue monitor 402, and transaction memory 406. In various embodiments, the thermal load may be the rate of transaction requests received at the server 102 or the transaction load. In various such embodiments, any associated thresholds may be adjusted accordingly based on how a particular embodiment defines or determines thermal load. In some embodiments, application of an algorithm, such as a machine-learning algorithm, may be used to determine the thermal load on server 102 and/or a thermal load of an individual requested transaction 204.

In various embodiments, each requested transaction 204 that has yet to be serviced may contribute to the thermal load on server 102. In various such embodiments, the thermal load of each requested transaction 204 may be summed to determine the thermal load on server 102. In some embodiments, the thermal load of each requested transaction 204 may be based on the classification of the requested transaction. In some such embodiments, if a requested transaction 204 cannot be classified, the thermal load manager may measure one or more operation parameters of the requested transaction 204 before, during, and/or after it is processed to determine the thermal load of the requested transaction 204. For example, the thermal load manager 408 may measure the temperature of a processor element immediately before and immediately after the processor element services the requested transaction. In another example, the thermal load of a requested transaction 204 may be based on an amount of time to service the requested transaction. In various embodiments, a new class may be created based on the measured thermal load and one or more properties of the requested transaction. Classification of requested transactions will be discussed in more detail below, such as with respect to FIG. 7.

In some embodiments, the thermal load on server 102 or the thermal load of a requested transaction 204 may be compared to one or more thresholds by the thermal load manager 408 to determine when and/or how to induce random bounded delay in server transactions. For example, if the thermal load of the server 102 is compared to one or more thresholds, then the thermal load may be dynamically updated to indicate a current thermal load on the server. However, in another example, if the thermal load of a requested transaction 204 is compared to one or more thresholds, then the one or more thresholds may be dynamically updated to indicate a remaining available thermal capacity of server 102 and/or a portion thereof. In some embodiments, the delay may be randomized using a random number generator. In various embodiments, the delay may be bounded to prevent the rate of transaction service of the transaction processing system 100 from falling below a minimum acceptable level and/or to provide finer grained control over the random bounded delay. Determining when and how to induce random bounded delay in server transactions will be described in more detail below, such as with respect to FIGS. 5 and 6.

In various embodiments, the thermal load manager 408 may perform queue manipulation based on classifications. For instance, thermal load manager 408 may recognize that the processor component 208 can handle servicing an audio transaction without exceeding a threshold, but not a video transaction, therefore the audio transaction may be moved ahead of the video transaction in the transaction queue 202. In some embodiments, the transaction queue monitor 402 may perform queue manipulation. In various embodiments, the thermal load manager 408 may monitor one or more operational parameters of the processor component 208, such as the temperature and clock speed of each processor element in the processor component 208. Monitoring one or more operational parameters of the processor component 208 may enable the thermal load manager 408 to measure the thermal load of individual requested transactions.

In some embodiments, transaction memory 406 may serve as a repository for transaction history (e.g., one or more characteristics of completed transactions), thresholds, values, conditions, or the like. In some such embodiments a machine-learning algorithm may be applied to one or more portions of transaction memory 406 to determine, adjust, refine, or improve one or more values utilized or conditions applied to determine when and/or how to induce random bounded delay in server transactions. For example, a machine learning algorithm may be utilized to determine, adjust, refine, or improve one or more of the thermal load on the server 102, a threshold value, classifications of requested transactions, resource utilization of requested transactions, and the like.

The transaction assignor 410 may determine which processor element of processor component 208 to deliver a requested transaction 204 to for service. In various embodiments, the transaction assignor may operate at the direction of one or more other components for the transaction manager 206. For instance, the thermal load manager 408 or the transaction queue monitor 402 may cause the transaction assignor 410 to delay delivery of requested transactions to the processor component 208. In other embodiments, the transaction assignor 410 may assign a requested transaction 204 to a processor element of processor component 208 as soon as the requested transaction 204 is received by the transaction assignor 410. In other such embodiments, one or more other components of transaction manager 206 may delay providing a requested transaction 204 to the transaction assignor 410 until the requested transaction 204 may be performed.

It will be appreciated that while components of the transaction manager 206 can include the various arrangements and embodiments described herein, other arrangements and embodiments can additionally or alternatively be implemented to delay server transactions to mitigate periods of peak load conditions without departing from the present disclosure. For instance, one or more components may be separate from server 102 or transaction manager 206.

Figure 5:
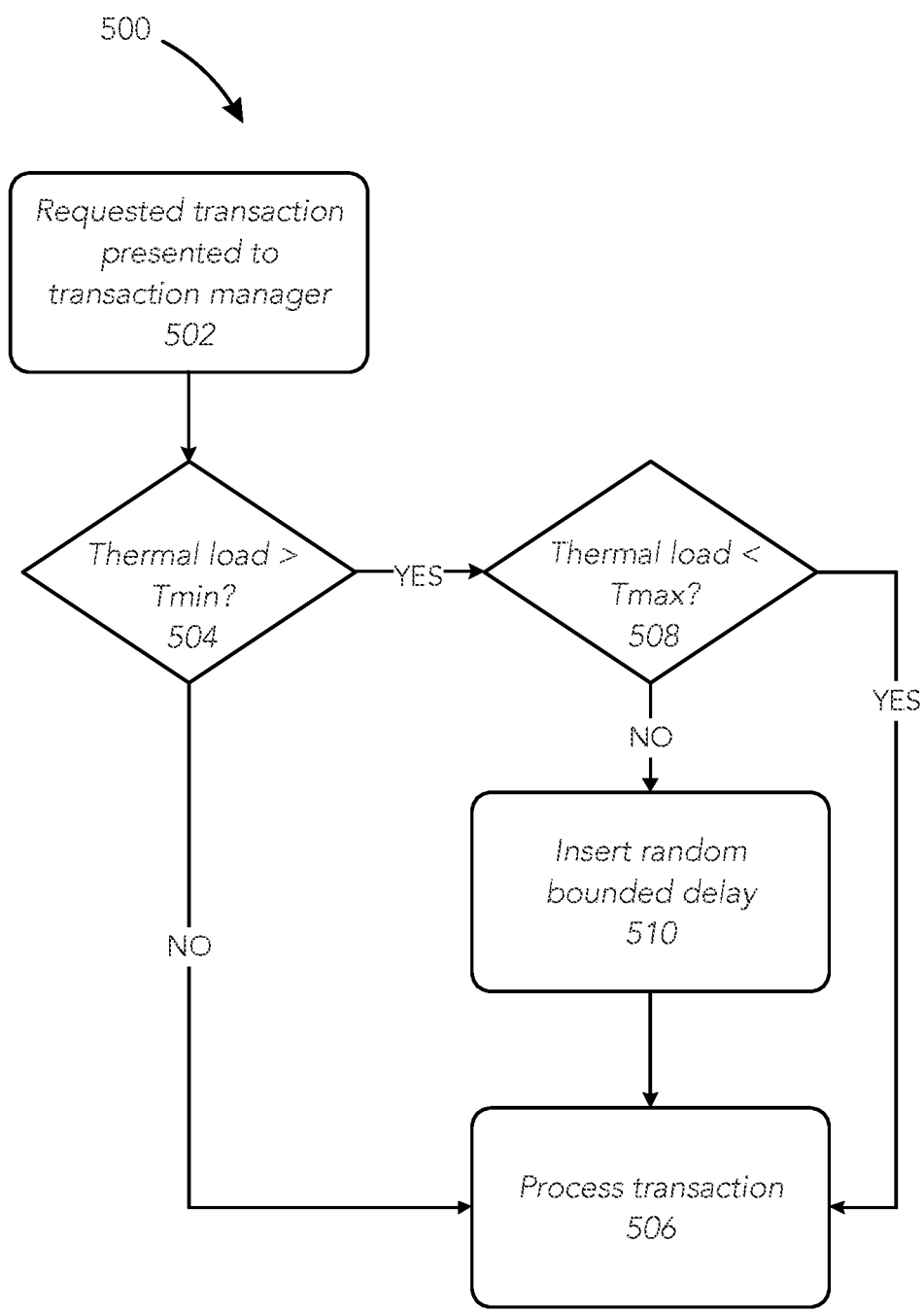
FIG. 5 illustrates an embodiment of a first logic flow.

FIG. 5 illustrates an example embodiment of a first logic flow 500. The logic flow 500 may be representative of some or all of the operations executed by one or more embodiments described herein. Further, the logic flow 500 may be performed by circuitry and one or more components discussed herein, such as transaction processing system 100, server 102, and transaction manager 206. Moreover, logic flow 500 may be performed in conjunction with one or more other logic flows discussed herein. Embodiments are not limited in this context.

The logic flow 500 may be one example processing flow for inducing random bounded delay in server transactions. Logic flow 500 is described from the perspective that a thermal load of the server 102 is compared to one or more thresholds and the thermal load is dynamically updated to indicate a current thermal load on the server. However, it will be appreciated that the thermal load of a requested transaction 204 may be compared to one or more thresholds and the one or more thresholds may be dynamically updated to indicate a remaining available thermal capacity of server 102 and/or a portion thereof.

At block 502, a requested transaction 204 may be presented to transaction manager 206. In some embodiments, a requested transaction 204 may be presented to the transaction manager 206 by being added to the transaction queue 202. In other embodiments, a requested transaction 204 may be presented to the transaction manager when the associated transaction request is received by the server 102. In some embodiments, a requested transaction 204 may be presented to transaction manager 206 when the requested transaction 204 is received as input to one or more components of the transaction manager 206, such as the transaction queue monitor 402, transaction classifier 404, the thermal load manager 408, and/or the transaction assignor 410.

At block 504, the thermal load may be compared to a minimum threshold. For example, transaction manager 206 may determine whether servicing the requested transaction 204 would cause the thermal load of the server 102 to exceed the minimum threshold. In various embodiments, the minimum threshold may be referred to as a lower threshold. In some embodiments, the thermal load may be based on one or more parameters associated with server 102. For example, the thermal load may be based on one or more of the rate of transaction requests received at server 102, the required resources to service the requested transaction, the temperature of one or more processor elements, a classification of the requested transaction, and operation or performance parameters of server 102. In various embodiments, the minimum threshold may be at or below a rate of transaction service in the server 102 that may cause the server 102 to generate heat at an unmaintainable rate. In some such embodiments, the unmaintainable rate may result in a reduction of clock speed in the plurality of processor elements absent delay of delivery of at least one requested transaction 204 to a processor element of the plurality of processor elements for service.

If the thermal load is at or below the minimum threshold, at block 506, the requested transaction 204 may be processed. In various embodiments, processing a transaction may refer to servicing or performing the transaction with one or more processor elements. In some embodiments, processing a transaction may include passing the requested transaction 204 to the transaction assignor 410 for assignment to one or more processor elements of the processor component 208 for service.

If the thermal load is above the minimum threshold, at block 508, the thermal load may be compared to a maximum threshold. For example, transaction manager 206 may determine whether servicing the requested transaction 204 would cause the thermal load of the server 102 to exceed the maximum threshold. In some embodiments the maximum threshold may be referred to as an upper threshold. In various embodiments, the maximum threshold may be at or below a rate of transaction service in the server 102 that may cause the transaction queue 202 to overflow. In some embodiments, the maximum threshold may be based on a minimum allowable rate of transaction service in the server 102. For example, the maximum threshold may indicate that inserting a random delay before processing the transaction sufficient to prevent protective features of server 102 from reducing hardware performance would exceed the bounds of the random bounded delay and thereby cause the rate of transaction service to fall below a minimum. In various embodiments, the maximum threshold may be based on a rate of transaction requests received.

If the thermal load is below the maximum threshold, at block 510, a random bounded delay may be inserted to delay servicing the requested transaction. In various embodiments, the random bounded delay may be inserted at any time before service of the requested transaction 204 by one or more processor elements of the processor component 208. For example, one more components of transaction manager 206 may implement the random bounded delay or one or more components of processor component 208 may implement the random bounded delay. In various embodiments insertion of the random bounded delay may prevent a reduction in hardware performance in server 102, such as by one or more protective features.

If the thermal load is at or above the maximum threshold, at block 506, the transaction may be processed. In various embodiments, processing a transaction may refer to servicing or performing the transaction with one or more processor elements. In some embodiments, processing a transaction may include passing the requested transaction 204 to the transaction assignor 410 for assignment to one or more processor elements of the processor component 208 for service. In some embodiments, when the thermal load is at or above the maximum threshold, the server 102 may generate heat at an unmaintainable rate. In some such embodiments, the unmaintainable rate may result in a reduction of clock speed in the plurality of processor elements of processor component 208.

Figure 6:
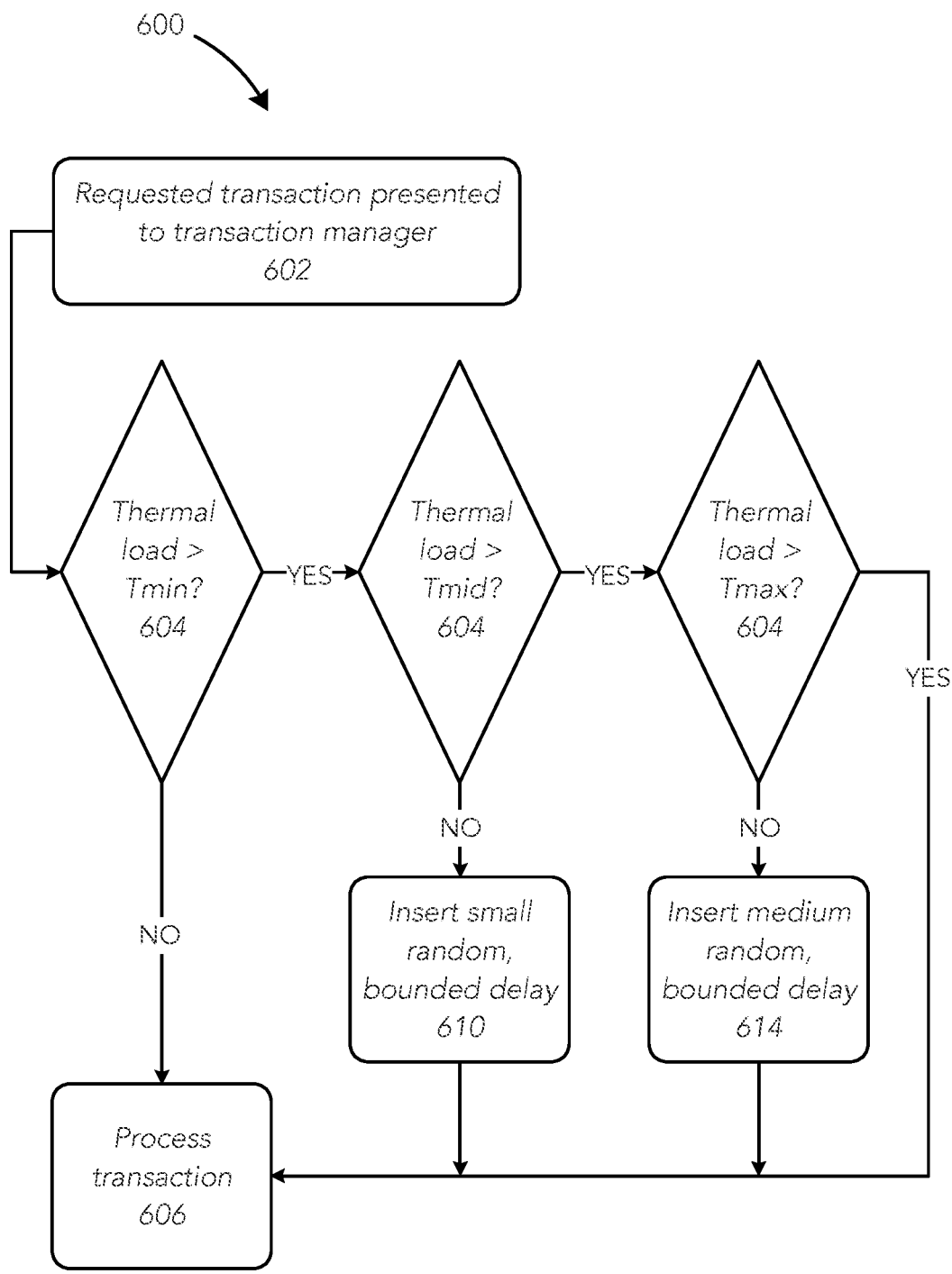
FIG. 6 illustrates an embodiment of a second logic flow.

FIG. 6 illustrates an example embodiment of a second logic flow 600. The logic flow 600 may be representative of some or all of the operations executed by one or more embodiments described herein. Further, the logic flow 600 may be performed by circuitry and one or more components discussed herein, such as transaction processing system 100, server 102, and transaction manager 206. Moreover, logic flow 600 may be performed in conjunction with one or more other logic flows discussed herein. Embodiments are not limited in this context.

The logic flow 600 may be one example processing flow for inducing random bounded delay in server transactions. In logic flow 600, steps 602-606 may be the same or similar to steps 502-506 described above for logic flow 500. In logic flow 600, the additional or different steps may enable either a small random bounded delay or a medium random bounded delay to be inserted prior to processing a requested transaction, providing finer grained control over the random bounded delay. Finer grained control over the random bounded delay enable a better performing transaction processing system 100. As will be appreciated, even finer grained control over the random bounded delay may be achieved without departing from the scope of this disclosure.

Similar to logic flow 500, logic flow 600 is described from the perspective that a thermal load of the server 102 is compared to one or more thresholds and the thermal load is dynamically updated to indicate a current thermal load on the server. However, it will be appreciated that the thermal load of a requested transaction 204 may be compared to one or more thresholds and the one or more thresholds may be dynamically updated to indicate a remaining available thermal capacity of server 102 and/or a portion thereof.

At block 608, the thermal load may be compared to a middle threshold. For example, transaction manager 206 may determine whether servicing the requested transaction 204 would cause the thermal load of the server 102 to exceed the middle threshold. If the thermal load is below the middle threshold, at block 610, a small random bounded delay may be inserted prior to servicing the transaction at block 606. If the thermal load is at or above the middle threshold, at block 612, the thermal load may be compared to the maximum thermal load. If the thermal load is below the maximum threshold, at block 614, a medium random bounded delay may be inserted prior to servicing the requested transaction 204 at block 606. If the thermal load is at or above the maximum threshold, at block 606, the transaction may be processed without insertion of a random bounded delay.

Figure 7:
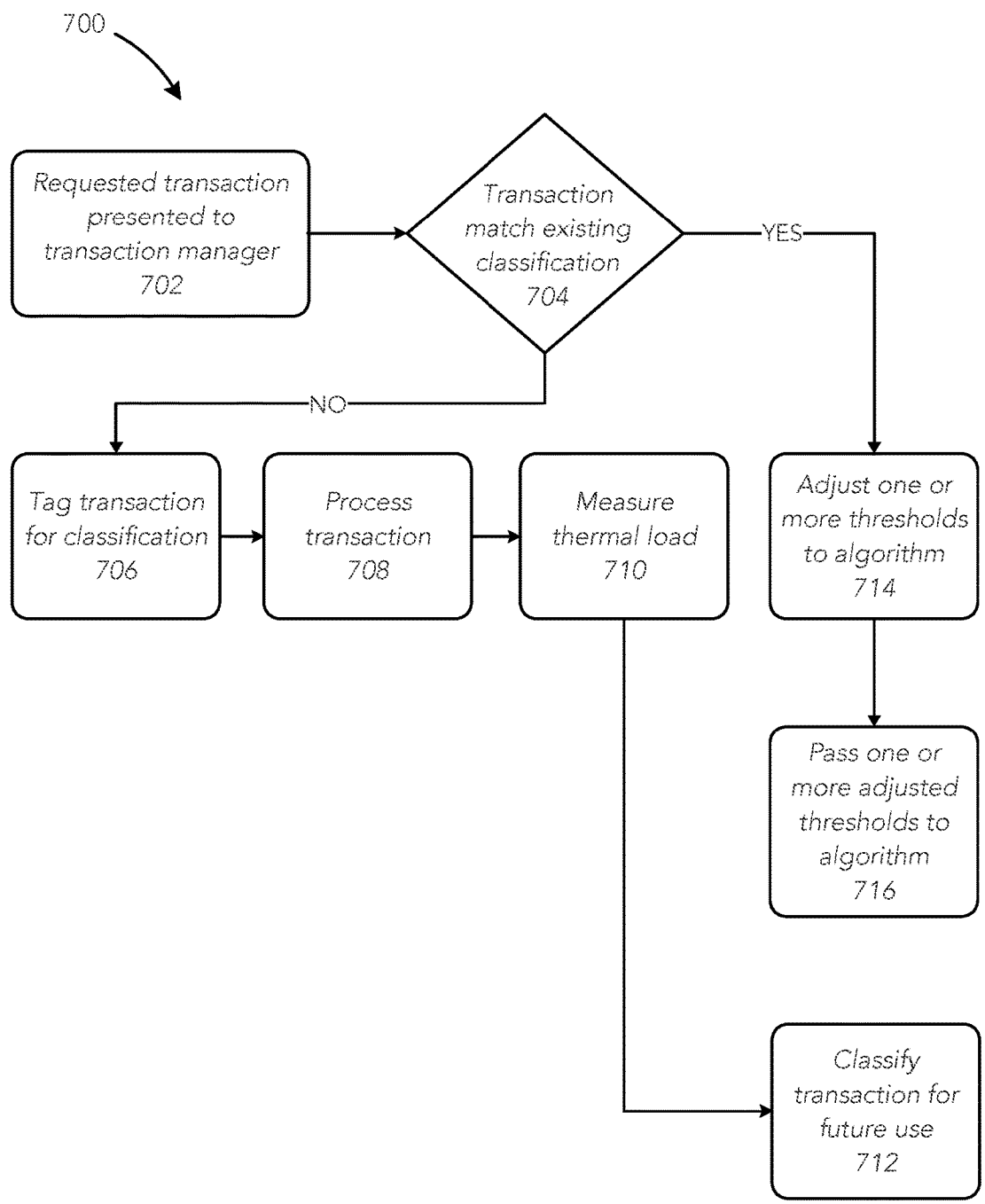
FIG. 7 illustrates an embodiment of a third logic flow.

FIG. 7 illustrates an example embodiment of a third logic flow 700. The logic flow 700 may be representative of some or all of the operations executed by one or more embodiments described herein. Further, the logic flow 700 may be performed by circuitry and one or more components discussed herein, such as transaction processing system 100, server 102, and transaction manager 206. Moreover, logic flow 700 may be performed in conjunction with one or more other logic flows discussed herein. Embodiments are not limited in this context.

The logic flow 700 may be one example processing flow for creating and determining classes for requested transactions. At block 702, a requested transaction 204 may be presented to transaction manager 206. In some embodiments, a requested transaction 204 may be presented to the transaction manager 206 by being added to the transaction queue 202. In other embodiments, a requested transaction 204 may be presented to the transaction manager when the associated transaction request is received by the server 102. In some embodiments, a requested transaction 204 may be presented to transaction manager 206 when the requested transaction 204 is received as input to one or more components of the transaction manager 206, such as the transaction queue monitor 402, transaction classifier 404, the thermal load manager 408, and/or the transaction assignor 410.

At block 704, it may be determined whether the requested transaction 204 matches an existing classification. For example, transaction classifier 404 may compare one or more properties of a requested transaction 204 to completed transactions in transaction memory 406. In various embodiments a machine-learning algorithm may be utilized to classify requested transactions. For example, a model for each classification may be created based on one or more completed transactions in transaction memory 406. In such examples, a requested transaction 204 may be compared to or run through one or more models to determine whether the requested transaction 204 belongs to an existing classification.

If a requested transaction 204 does not belong to an existing classification, at block 706, the requested transaction 204 may be tagged for classification (hereinafter "tagged transaction"). For example, transaction classifier 404 may tag the requested transaction 204 for classification. In some embodiments, tagging a requested transaction 204 may cause one or more informational elements of the requested transaction 204 (see e.g., FIG. 3) to be retained, when they would otherwise be discarded. For example, characteristics and/or informational elements of a requested transaction 204 tagged for classification may be stored in transaction memory 406. At block 708, the tagged transaction may be processed.

Proceeding to block 710, the thermal load on the tagged transaction may be measured. In some embodiments, the tag may cause the thermal load manager 408 to measure the thermal load of the tagged transaction. In various embodiments, the thermal load manager 408 may monitor one or more operational parameters of the processor component 208, such as the temperature and clock speed of each processor element in the processor component 208. Monitoring one or more operational parameters of the processor component 208 may enable the thermal load manager 408 to measure the thermal load of individual requested transactions.

In some embodiments, the thermal load manager 408 may measure one or more operational parameters of the tagged transaction before, during, and/or after it is processed to determine the thermal load of the tagged transaction. For example, to measure the thermal load of a tagged transaction, the thermal load manager 408 may do one or more of measure the temperature of a processor element immediately before and immediately after the processor element services the tagged transaction, measure an amount of time to service the tagged transaction, and measure resource utilization of the tagged transaction.

Once the thermal load of a tagged transaction has been measured, at block 712, it may be classified for future use. In various embodiments, a new class may be created based on the measured thermal load and one or more properties of the tagged transaction. In some embodiments, a machine-learning algorithm may create a model for the tagged transaction for use in classifying future requested transactions.

Returning to block 704, if the requested transaction 204 does match an existing classification the requested transaction may be classified (hereinafter "classified transaction") and the logic flow 700 may proceed to block 714. At block 714, one or more thresholds may be adjusted to reflect the addition of the classified transaction. For example, the one or more thresholds may be dynamically updated to indicate a remaining available thermal capacity of server 102 and/or a portion thereof. In embodiments that the thermal load of the server 102 is compared to one or more thresholds, then the thermal load may be dynamically updated to indicate a current thermal load on the server 102. Once the one or more thresholds are adjusted, at block 716, the one or more adjusted thresholds may be passed to an algorithm. For example, the one or more adjusted thresholds may be passed to any algorithms used to determine when and/or how to induce random bounded delays in server transactions to update the appropriate thresholds, such as the thresholds illustrated in logic flow 500 and logic flow 600. Alternately or additionally, if thermal loads are adjusted, the adjusted thermal loads may be passed to any algorithms used to determine when and/or how to induce random bounded delays in server transactions to update the appropriate values, such as the thermal load values illustrated in logic flow 500 and logic flow 600.

Figure 8:
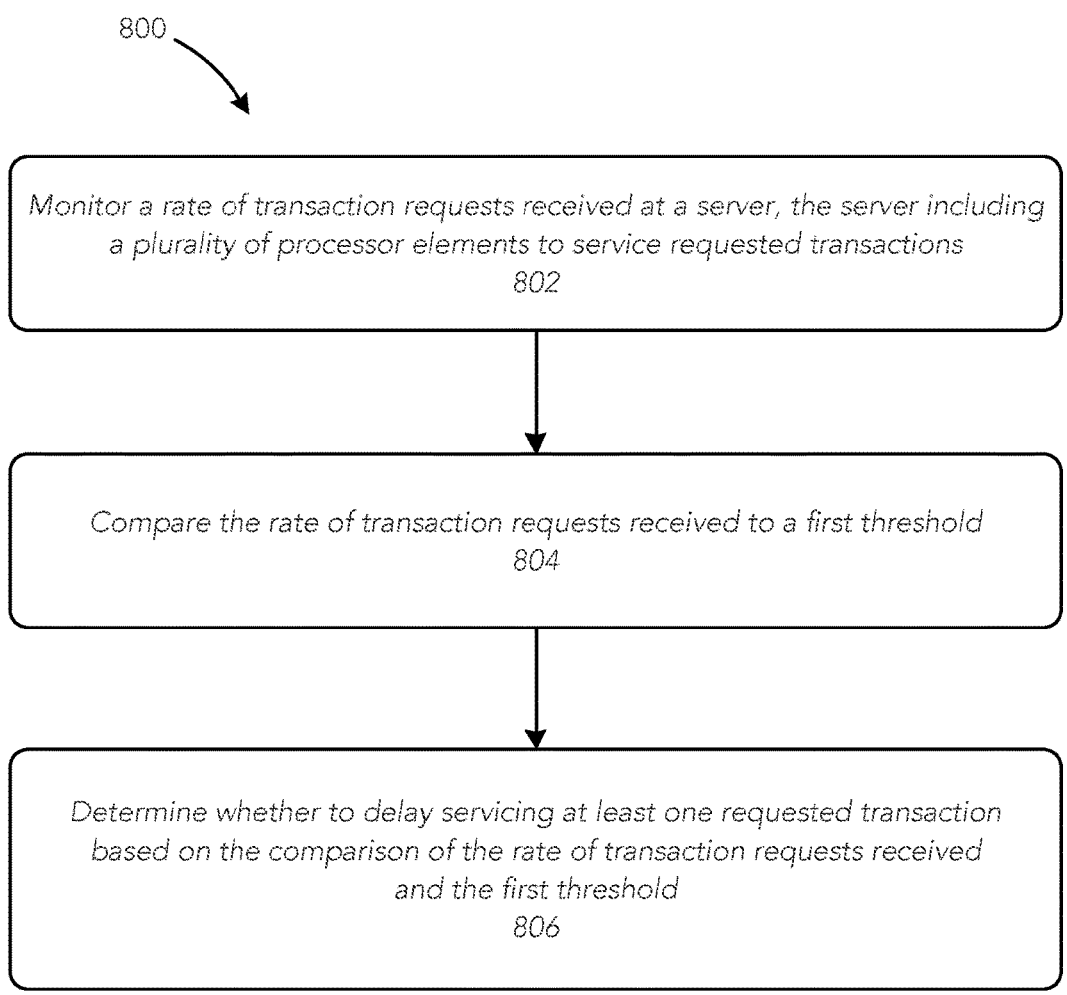
FIG. 8 illustrates an embodiment of a fourth logic flow.

FIG. 8 illustrates one embodiments of a fourth logic flow 800. The logic flow 800 may be representative of some or all of the operations executed by one or more embodiments described herein, such as transaction processing system 100, server 102, or transaction manager 206. Embodiments are not limited in this context.

In the illustrated embodiment shown in FIG. 8, the logic flow 800 may begin at block 802. At block 802 "monitor a rate of transaction requests received at a server, the server including a plurality of processor elements to service requested transactions" a rate of transaction requests received at server 102 may be monitored. For example, one or more components of transaction manager 206, such as transaction queue monitor 402, may monitor the rate of transaction requests received at server 102. In some embodiments, the plurality of processor elements 210-1, 210-2, 210-m of processor component 208 may service the requested transactions 204-1, 204-2, 204-n.

Continuing to block 804 "compare the rate of transaction requests received to a first threshold" the rate of transaction requests received at server 102 may be compared to a thermal threshold. For example, transaction queue monitor 402 or thermal load manager 408 may compare the rate of transaction requests received at server 102 with a threshold rate of transaction requests received at server 102, such as one based on an unmaintainable rate of heat generation. In block 806 "determine whether to delay servicing at least one requested transaction based on the comparison of the rate of transaction requests received and the first threshold" transaction manager 206 may determine whether or not to induce random bounded delays in server transactions of server 102. For example, service may be delayed to at least one requested transaction when the rate of transaction requests received is above the first threshold.

Figure 9:
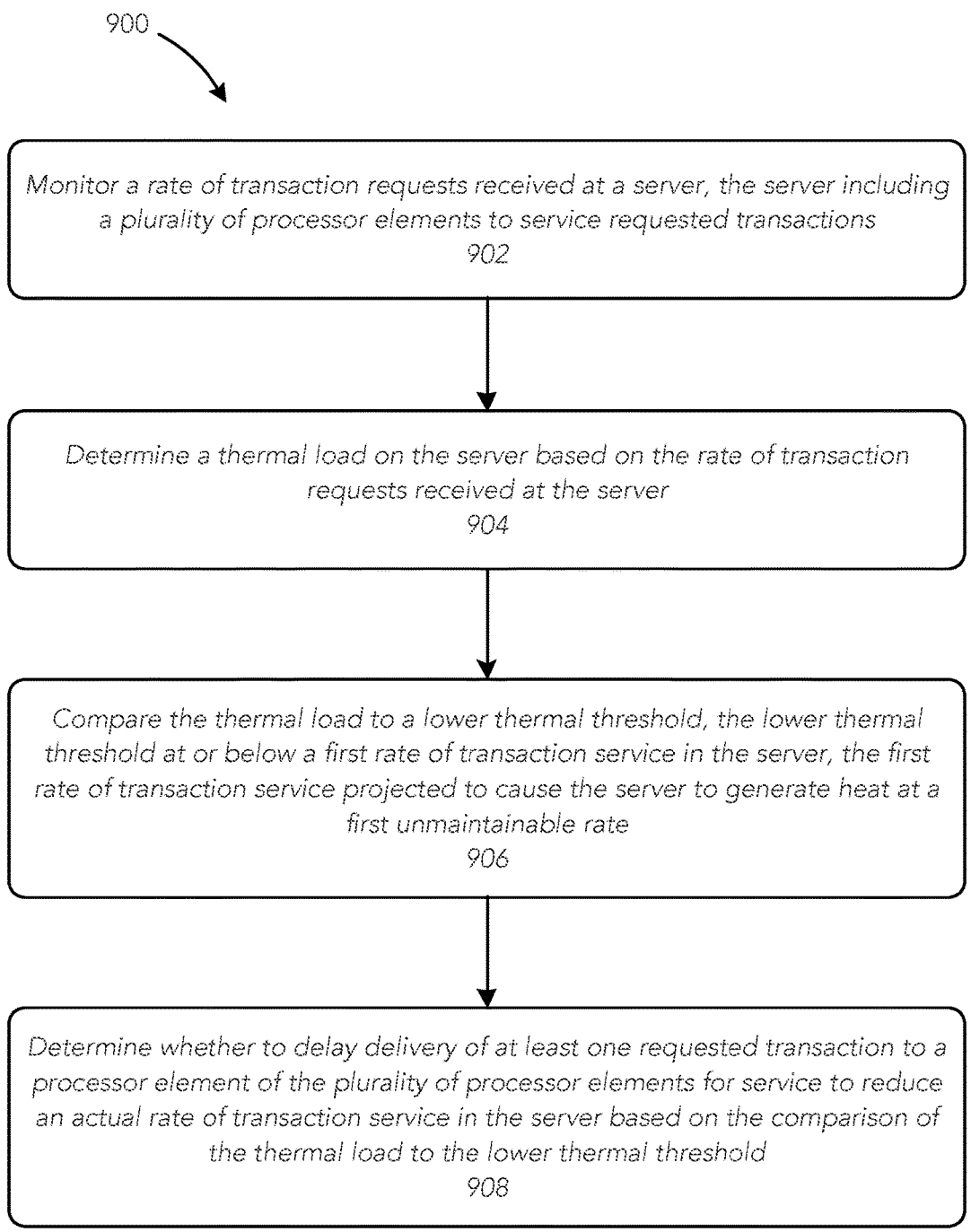
FIG. 9 illustrates an embodiment of a fifth logic flow.

FIG. 9 illustrates one embodiments of a fifth logic flow 900. The logic flow 800 may be representative of some or all of the operations executed by one or more embodiments described herein, such as transaction processing system 100, server 102, or transaction manager 206. Embodiments are not limited in this context.

In the illustrated embodiment shown in FIG. 9, the logic flow 900 may begin at block 902. At block 902 "monitor a rate of transaction requests received at a server, the server including a plurality of processor elements to service requested transactions" a rate of transaction requests received at server 102 may be monitored. For example, one or more components of transaction manager 206, such as transaction queue monitor 402, may monitor the rate of transaction requests received at server 102. In some embodiments, the plurality of processor elements 210-1, 210-2, 210-m of processor component 208 may service the requested transactions 204-1, 204-2, 204-n.

Continuing to block 904 "determine a thermal load on the server based on the rate of transaction requests received at the server" a thermal load on server 102 may be determined based on the rate of transaction requests received. For example, thermal load manager 408 may determine a thermal load on server 102 based on the rate of transaction requests received at server 102 and a classification of one or more requested transactions. In some embodiments, the thermal load on the server may be the rate of transaction requests received at server 102.

In block 906 "compare the thermal load to a lower thermal threshold, the lower thermal threshold at or below a first rate of transaction service in the server, the first rate of transaction service projected to cause the server to generate heat at a first unmaintainable rate" one or more components of transaction manager 206 may compare a thermal load on server 102 to a threshold based on a rate of transaction service in server. For example, transaction queue monitor 402 or thermal load manager 408 may compare thermal load on server 102 with a threshold rate of transaction service for server 102, such as one based on an unmaintainable rate of heat generation. At block 908 "determine whether to delay delivery of at least one requested transaction to a processor element of the plurality of processor elements for service to reduce an actual rate of transaction service in the server based on the comparison of the thermal load and the lower thermal threshold" transaction manager 206 may determine whether or not to induce random bounded delays in server transactions of server 102. For example, service may be delayed to at least one requested transaction when the thermal load exceeds a lower thermal threshold.

Figure 10:
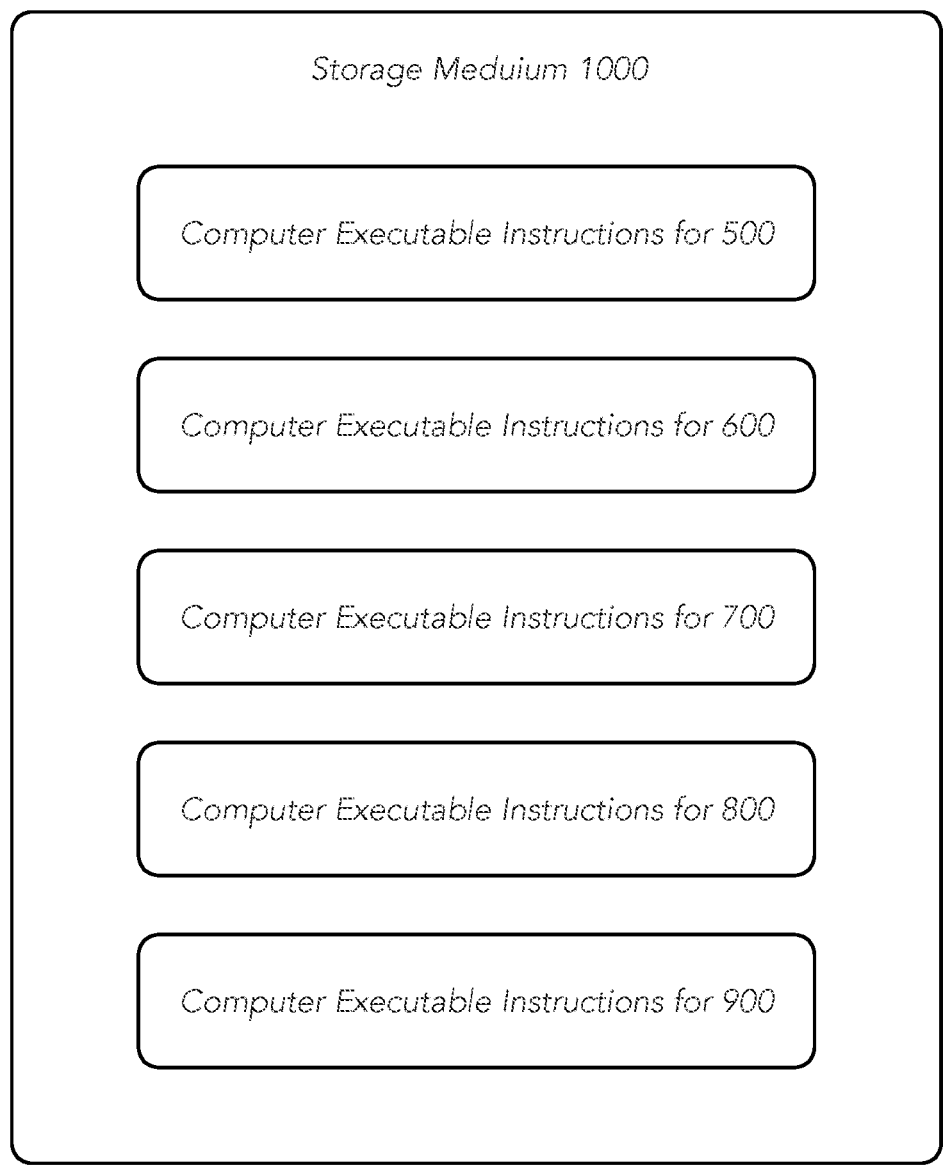
FIG. 10 illustrates an embodiment of a storage medium.

FIG. 10 illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement one or more of logic flows or operations described herein, such as with respect to 500 of FIG. 5, 600 of FIG. 6, 700 of FIG. 7, 800 of FIG. 8, or 900 of FIG. 9. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
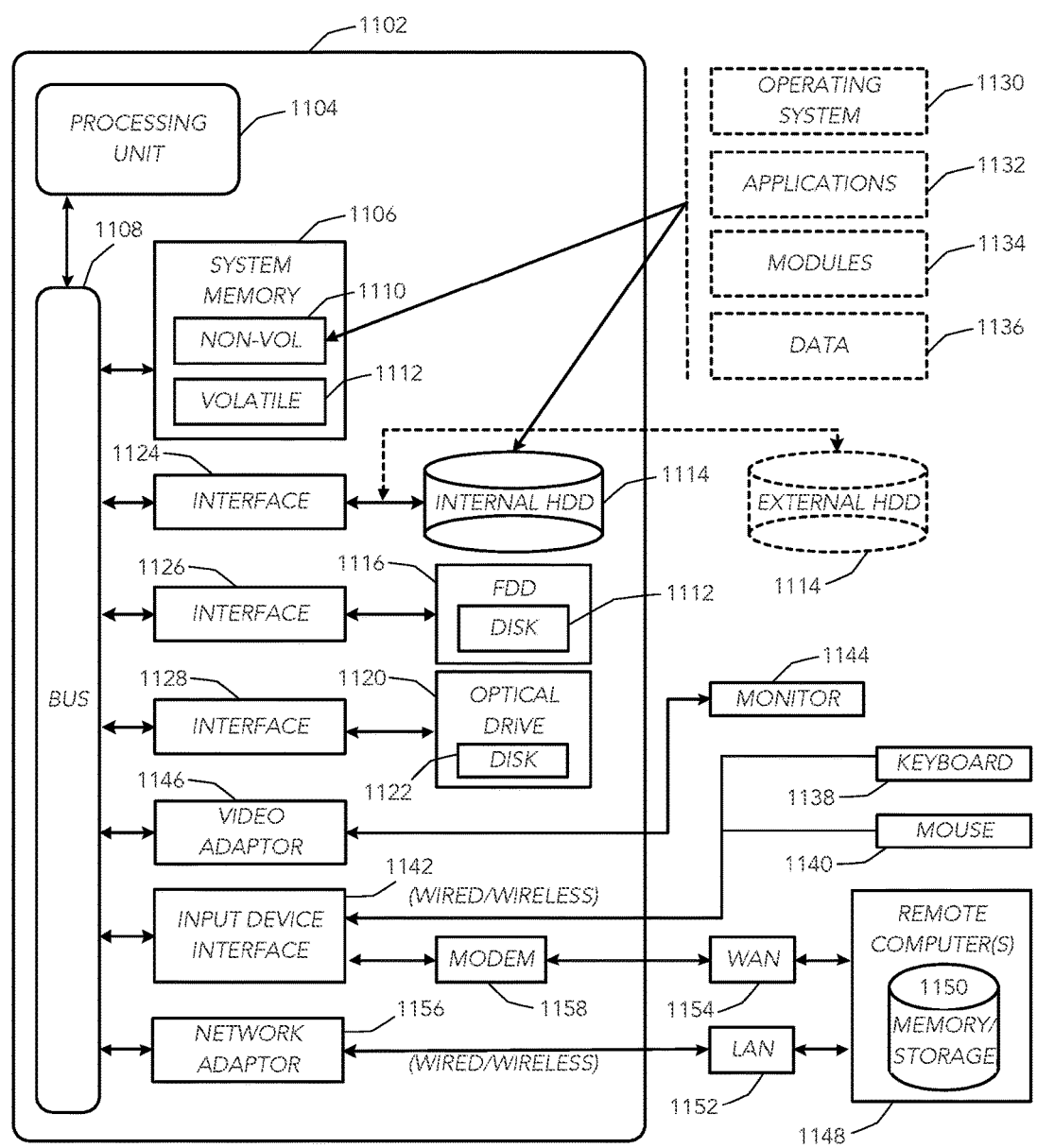
FIG. 11 illustrates an embodiment of a computing architecture.

FIG. 11 illustrates an embodiment of an exemplary computing architecture 1100 that may be suitable for implementing various embodiments as previously described. In various embodiments, the computing architecture 1100 may comprise or be implemented as part of an electronic device. In some embodiments, the computing architecture 1100 may be representative, for example, of a processor server that implements one or more components of the transaction processing system 100, such as server 102. In some embodiments, computing architecture 1100 may be representative, for example, of a computing device that implements one or more components of transaction manager 206. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the transaction processing system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 994 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
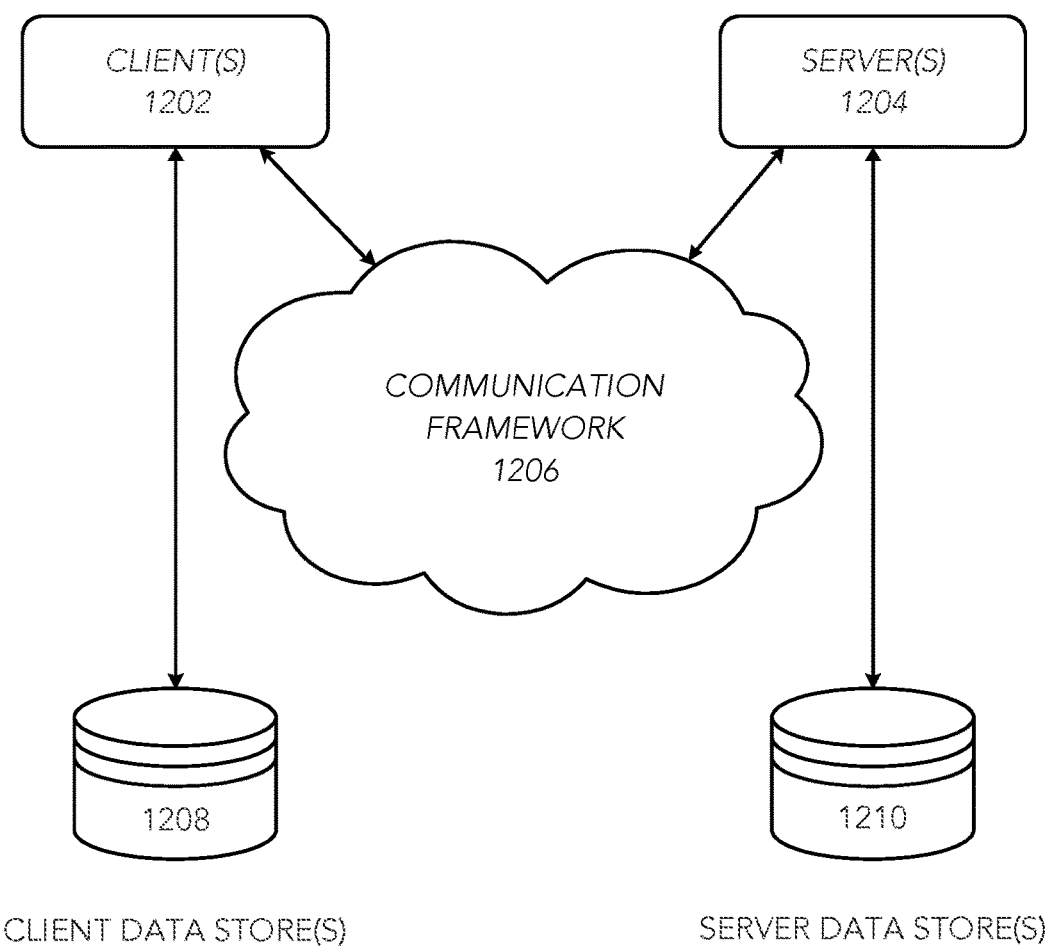
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 and the servers 1204 are operatively connected to one or more respective client data stores 1208 and server data stores 1210 that can be employed to store information local to the respective clients 1202 and servers 1204, such as cookies and/or associated contextual information. In various embodiments, any one of servers 1204 may implement one or more of logic flows or operations described herein, and storage medium 1000 of FIG. 10 in conjunction with storage of data received from any one of clients 1202 on any of server data stores 1210.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   memory; and
   logic, at least a portion of which is implemented in circuitry coupled to the memory, the logic configured to:
   monitor a rate of transaction requests received at a server, the server including a plurality of processor elements to service requested transactions;
   determine a thermal load on the server based on the rate of transaction requests received at the server;
   compare the thermal load to a lower thermal threshold, the lower thermal threshold at or below a first rate of transaction service in the server, the first rate of transaction service projected to cause the server to generate heat at a first unmaintainable rate;
   determine whether to delay delivery of at least one requested transaction to a processor element of the plurality of processor elements for service to reduce an actual rate of transaction service in the server based on the comparison of the thermal load to the lower thermal threshold;
   compare the thermal load to an upper thermal threshold, the upper thermal threshold based on a minimum allowable rate of transaction service in the server;
   determine whether to delay delivery of at least one requested transaction to a processor element of the plurality of processor elements for service to reduce the actual rate of transaction service in the server based on the comparison of the thermal load to the lower thermal threshold and the upper thermal threshold.

2. The apparatus of claim 1, the logic to delay delivery of at least one requested transaction to a processor element of the plurality of processor elements for service to reduce the actual rate of transaction service in the server when the thermal load is at or above the lower thermal threshold.

3. The apparatus of claim 2, the logic to delay delivery of at least one requested transaction by a random bounded delay amount to reduce the actual rate of transaction service in the server.

4. The apparatus of claim 1, the delay of delivery of at least one requested transaction to a processor element of the plurality of processor elements for service to spread service of a peak in requested transactions over a window of time to reduce a peak in the actual rate of transaction service in the server over the window of time.

5. The apparatus of claim 1, the first unmaintainable rate of heat generation projected to cause the server to reduce the clock speed of one or more of the plurality of processing elements in the server without delay of delivery of at least one requested transaction to a processor element of the plurality of processor elements for service.

6. The apparatus of claim 1, the logic to:
compare the thermal load to a middle thermal threshold, the middle thermal threshold at or below a second rate of transaction service in the server, the second rate of transaction service projected to cause the server to generate heat at a second unmaintainable rate, the second unmaintainable rate above the first unmaintainable rate; and
determine whether to delay delivery of at least one requested transaction to a processor element of the plurality of processor elements for service to reduce the actual rate of transaction service in the server based on the comparison of the thermal load to the lower thermal threshold and the middle thermal threshold.

7. The apparatus of claim 6, the logic to delay delivery of at least one requested transaction to a processor element of the plurality of processor elements for service by a first random bounded delay amount when the thermal load is at or above the lower thermal threshold and at or below the middle thermal threshold and delay delivery of at least one requested transaction to a processor element of the plurality of processor elements for service by a second random bounded delay amount when the thermal load is at or above the middle thermal threshold, an upper boundary of the first random bounded delay amount less than a lower boundary of the second random bounded delay.

8. The apparatus of claim 1, the logic to:
compare the thermal load to an upper thermal threshold, the upper thermal threshold at or below a threshold rate of transaction service, the threshold rate of transaction service projected to cause a transaction queue of the server to overflow;
determine whether to delay delivery of at least one requested transaction to a processor element of the plurality of processor elements for service to reduce the actual rate of transaction service in the server based on the comparison of the thermal load to the lower thermal threshold and the upper thermal threshold.

9. The apparatus of claim 1, the logic to delay delivery of at least one requested transaction to a processor element of the plurality of processor elements for service to the reduce actual rate of transaction service in the server when the thermal load is at or above the lower thermal threshold and at or below the upper thermal threshold.

10. A non-transitory computer-readable medium comprising a plurality of instructions that when executed enable processing circuitry to:
monitor a rate of transaction requests received at a server, the server to include a plurality of processor elements to service requested transactions;
compare the rate of transaction requests received to a first threshold;
determine whether to delay servicing at least one requested transaction based on the comparison of the rate of transaction requests received and the first threshold;
compare the rate of transaction requests received to a second threshold, the second threshold larger than the first threshold;
determine whether to delay servicing of at least one requested transaction to a processor element of the plurality of processor elements for service based on the comparison of the rate of transaction requests received and the second threshold;
delay service of at least one requested transaction by a first amount of time when the rate of transaction requests received is between the first threshold and the second threshold; and
delay service of at least one requested transaction by a second amount of time when the rate of transaction requests received exceeds the first threshold and the second threshold, the second amount of time larger than the first amount of time.

11. The non-transitory computer-readable storage medium of claim 10, comprising the plurality of instructions that when executed enable the processing circuitry to delay service of at least one requested transaction when the rate of transaction requests received is above the first threshold.

12. The non-transitory computer-readable storage medium of claim 11, comprising the plurality of instructions that when executed enable the processing circuitry to delay service of at least one requested transaction through delivery delay of at least one requested transaction to a processor element of the plurality of processor elements for service.

13. The non-transitory computer-readable storage medium of claim 10, comprising the plurality of instructions that when executed enable the processing circuitry to service each transaction request received without delay when the rate of transaction requests received is below the first threshold.

14. The non-transitory computer-readable storage medium of claim 10, comprising the plurality of instructions that when executed enable the processing circuitry to:
compare the rate of transaction requests received to a third threshold, the third threshold larger than the first threshold and the second threshold; and
determine whether to delay servicing of at least one requested transaction to a processor element of the plurality of processor elements for service based on the comparison of the rate of transaction requests received and the third threshold.

15. A computer-implemented method, comprising:
monitoring a rate of transaction requests received at a server, the server including a plurality of processor elements to service requested transactions;
comparing the rate of transaction requests received to a first threshold, the first threshold at or below a first rate of transaction service in the server, the first rate of transaction service projected to cause the server to generate heat at an unmaintainable rate;
determining whether to delay servicing at least one requested transaction to a processor element for service to reduce an actual rate of transaction service in the server based on the comparison of the rate of transaction requests received and the first threshold;

comparing the rate of transaction requests received to a second threshold, the second threshold larger than the first threshold;

determining whether to delay servicing of at least one requested transaction to a processor element of the plurality of processor elements for service based on the comparison of the rate of transaction requests received and the second threshold;

delaying service of at least one requested transaction by a first amount of time when the rate of transaction requests received is between the first threshold and the second threshold; and delaying service of at least one requested transaction by a second amount of time when the rate of transaction requests received exceeds the first threshold and the second threshold, the second amount of time larger than the first amount of time.

16. The computer-implemented method of claim 15, comprising delaying service of at least one requested transaction when the rate of transaction requests received is above the first threshold.

17. The computer-implemented method of claim 16, comprising delaying service of at least one requested transaction by delaying delivery of at least one requested transaction to a processor element of the plurality of processor elements for service.

18. The computer-implemented method of claim 15, comprising servicing each transaction request received without delay when the rate of transaction requests received is below the first threshold.

19. The computer-implemented method of claim 15, comprising:

comparing the rate of transaction requests received to a third threshold, the third threshold larger than the first threshold and the second threshold; and determining whether to delay servicing of at least one requested transaction to a processor element of the plurality of processor elements for service based on the comparison of the rate of transaction requests received and the third threshold.

20. The computer-implemented method of claim 19, comprising servicing each transaction request received without delay when the rate of transaction requests received exceeds the first threshold, the second threshold, and the third threshold.

* * * * *